(12) United States Patent
Khare et al.

(10) Patent No.: US 8,559,688 B2
(45) Date of Patent: Oct. 15, 2013

(54) SYSTEM AND METHOD FOR PROCESSING DATA SIGNALS

(75) Inventors: Kedar Bhalchandra Khare, Niskayuna, NY (US); Kevin Franklin King, Menomonee Falls, WI (US); Luca Marinelli, Schenectady, NY (US); Christopher Judson Hardy, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 761 days.

(21) Appl. No.: 12/826,801

(22) Filed: Jun. 30, 2010

(65) Prior Publication Data
US 2012/0002854 A1  Jan. 5, 2012

(51) Int. Cl.
*G06K 9/00* (2006.01)
(52) U.S. Cl.
USPC ........... 382/131; 382/176; 382/324; 382/300; 382/167; 358/522; 358/518
(58) Field of Classification Search
USPC ............. 382/131, 156, 176, 300, 324, 167; 358/518, 522
See application file for complete search history.

(56) References Cited

U.S. PATENT DOCUMENTS

| | | | | |
|---|---|---|---|---|
| 5,629,990 A | * | 5/1997 | Tsuji et al. | 382/324 |
| 5,872,864 A | * | 2/1999 | Imade et al. | 382/176 |
| 5,917,963 A | * | 6/1999 | Miyake | 382/300 |
| 5,995,669 A | * | 11/1999 | Shingu et al. | 382/237 |
| 6,078,410 A | * | 6/2000 | Adachi | 358/522 |
| 6,148,101 A | * | 11/2000 | Tanaka et al. | 382/156 |
| 6,240,206 B1 | * | 5/2001 | Tokuyama et al. | 382/176 |
| 6,885,482 B1 | * | 4/2005 | Kubo et al. | 358/518 |
| 6,888,963 B2 | * | 5/2005 | Nichogi | 382/167 |
| 8,160,342 B2 | * | 4/2012 | Khare et al. | 382/131 |
| 2009/0262996 A1 | | 10/2009 | Samsonov et al. | |
| 2010/0011268 A1 | | 1/2010 | Sinop et al. | |

OTHER PUBLICATIONS

Google search results, May 21, 2013.*
Dialog Search History, May 24, 2013.*
Yu E. Nesterov; A Method for Solving a Convex Programming Problem with Convergence Rate 0(1/k2); Available from the internet<http://www.core.ucl.ac.be/~nesterov/Research/Papers/DAN83.pdf>; 1983 American Mathematical Society; pp. 372-376.
David L. Donoho, Iain M. Johnstone; "Adapting to Unknown Smoothness via Wavelet Shrinkage"; Available from the internet<http://www-stat.stanford.edu/~imj/WEBLIST/1995/ausws.pdf>: Jul. 20, 1994; 28 Pages.

(Continued)

*Primary Examiner* — Dilek B Cobanoglu
(74) *Attorney, Agent, or Firm* — Jason K. Klindtworth

(57) ABSTRACT

A signal processing method is presented. The method includes acquiring undersampled data corresponding to an object, initializing a first image solution and a second image solution, determining a linear combination solution based upon the first image solution and the second image solution, generating a plurality of selected coefficients by iteratively updating the first image solution, the second image solution and the linear combination solution and adaptively thresholding one or more transform coefficients utilizing the undersampled data, an updated first image solution, an updated second image solution and an updated linear combination solution, and reconstructing a data signal using the plurality of selected coefficients.

20 Claims, 6 Drawing Sheets

(56) References Cited

OTHER PUBLICATIONS

Ingrid Daubechies, Michel Defrise & Christine De Mol; "An Iterative Thresholding Algorithm for Linear Inverse Problems with a Sparsity Constraint"; Communications on Pure and Applied Mathematics, vol. LVII, 1413-1457 (2004); 45 Pages.

Amir Beck and Marc Teboulle; "A Fast Iterative Shrinkage—Thresholding Algorithm for Linear Inverse Problems"; 2009 Society for Industrial and Applied Mathematics; SIAM J. Imaging Sciences, vol. 2, No. 1, pp. 183-202.

* cited by examiner

SYSTEM AND METHOD FOR PROCESSING DATA SIGNALS

BACKGROUND

Embodiments of the invention relate generally to the field of signal processing, and more specifically to reducing the number of data samples required for image/signal reconstruction.

With advances in various areas of technology, such as, but not limited to, imaging, networking, healthcare, audio, video entertainment and communications, huge volumes of data are frequently generated. Typically, imaging and healthcare applications may acquire several images of one or more objects or patients and subsequently store these images, thereby entailing use of considerable storage space and processing time. Similarly, communication applications call for reductions in bandwidth and an increase in data transmission speed to communicate data. Traditionally, data compression techniques have been employed to aid in the efficient storage of such data. Data compression may entail encoding information using fewer bits (or other information-bearing units) than an unencoded representation would use through specific encoding schemes. By compressing the data, consumption of expensive resources, such as hard disk space or transmission bandwidth may be substantially reduced. Conventional compression techniques are usually applied as a post-processing step after the image/signal is reconstructed from the measured data.

Compressed sensing is a field of technology being increasingly used to aid in reducing the data measurements required for reconstructing the desired image and/or the desired signal. Through compressed sensing, it is recognized that images are often compressible, and thus image data may be acquired with fewer data samples. Conventional sampling requires the number of data samples associated with an image to be on the order of the number of pixels N in the image. The aim of compressed sensing is to start with fewer data samples (less than N, typically the number of data samples is of the order of degrees of freedom M in the image), and still achieve good image quality.

Furthermore, compressed sensing reduces the number of data measurements required for image/signal reconstruction. In Magnetic Resonance (MR) imaging or Computed Tomography (CT) imaging, it is desirable to obtain information about an object by measuring a digital signal representative of that object. These digital signals are used in construction of images, spectra, and volumetric images that are generally indicative of the state of the object, which may be a patient's body, a chemical in dilution, or a slice of the earth, for example. However, capturing and processing data related to the underlying object involve laborious and time-consuming processes. By way of an example, performing a Magnetic Resonance Imaging (MRI) scan of a patient, performing a three-dimensional (3D) CT scan of a patient, measuring a 3D nuclear magnetic resonance spectrum, and conducting a 3D seismic survey typically entail time-consuming processes. Compressed sensing is significant in these fields of technology as it allows use of a lower x-ray dose (in the case of CT) and faster image acquisition for MR or CT, which could ameliorate problems, for instance, with cardiac and respiratory motion and contrast bolus timing in MR angiography.

Conventional methods for image reconstruction typically do not make any prior assumptions regarding the compressible nature of the final reconstructed images. Also, if an assumption about the compressible nature of the images is made and a compressed sensing technique is used, the methods used for image reconstruction generally require substantial processing time. More specifically, conventional compressed sensing techniques are generally iterative in nature, and employ complicated non-linear cost functions and thus require substantial processing time. However, the minimization of the cost functions by the conventional methods leads to computationally intensive operations, since the minimization of cost functions requires evaluation of derivatives of non-linear terms. Further, solutions obtained via minimization of cost functions are very sensitive to free parameters. The free parameters, for example, represent weights of the terms in the cost functions. Furthermore, the conventional methods typically require human interventions for customization of the methods based upon a category of acquired data.

Thus, it is highly desirable to develop a compressed sensing technique that reduces processing time and manual intervention. More particularly, there is a need for an improved compressed sensing technique configured to enhance computational efficiency of signal processing, while making the reconstruction process automated or fully data-driven.

BRIEF DESCRIPTION

Briefly in accordance with one aspect of the technique, a signal processing method is presented. The method includes acquiring undersampled data corresponding to an object, initializing a first image solution and a second image solution, determining a linear combination solution based upon the first image solution and the second image solution, generating a plurality of selected coefficients by iteratively updating the first image solution, the second image solution and the linear combination solution and adaptively thresholding one or more transform coefficients utilizing the undersampled data, an updated first image solution, an updated second image solution and an updated linear combination solution, and reconstructing a data signal using the plurality of selected coefficients.

In accordance with another embodiment, a signal processing system is presented. The system includes one or more processors configured to receive undersampled data corresponding to an object, initialize a first image solution and a second image solution and determine a linear combination solution based upon the first image solution and the second image solution. The one or more processors are further configured to generate a plurality of selected coefficients by iteratively updating the first image solution, the second image solution and the linear combination solution and adaptively thresholding one or more transform coefficients utilizing the undersampled data, an updated first image solution, an updated second image solution and an updated linear combination solution, and reconstruct a data signal using the plurality of selected coefficients.

DRAWINGS

These and other features, aspects, and advantages of the present invention will become better understood when the following detailed description is read with reference to the accompanying drawings in which like characters represent like parts throughout the drawings, wherein.

Figure 1:
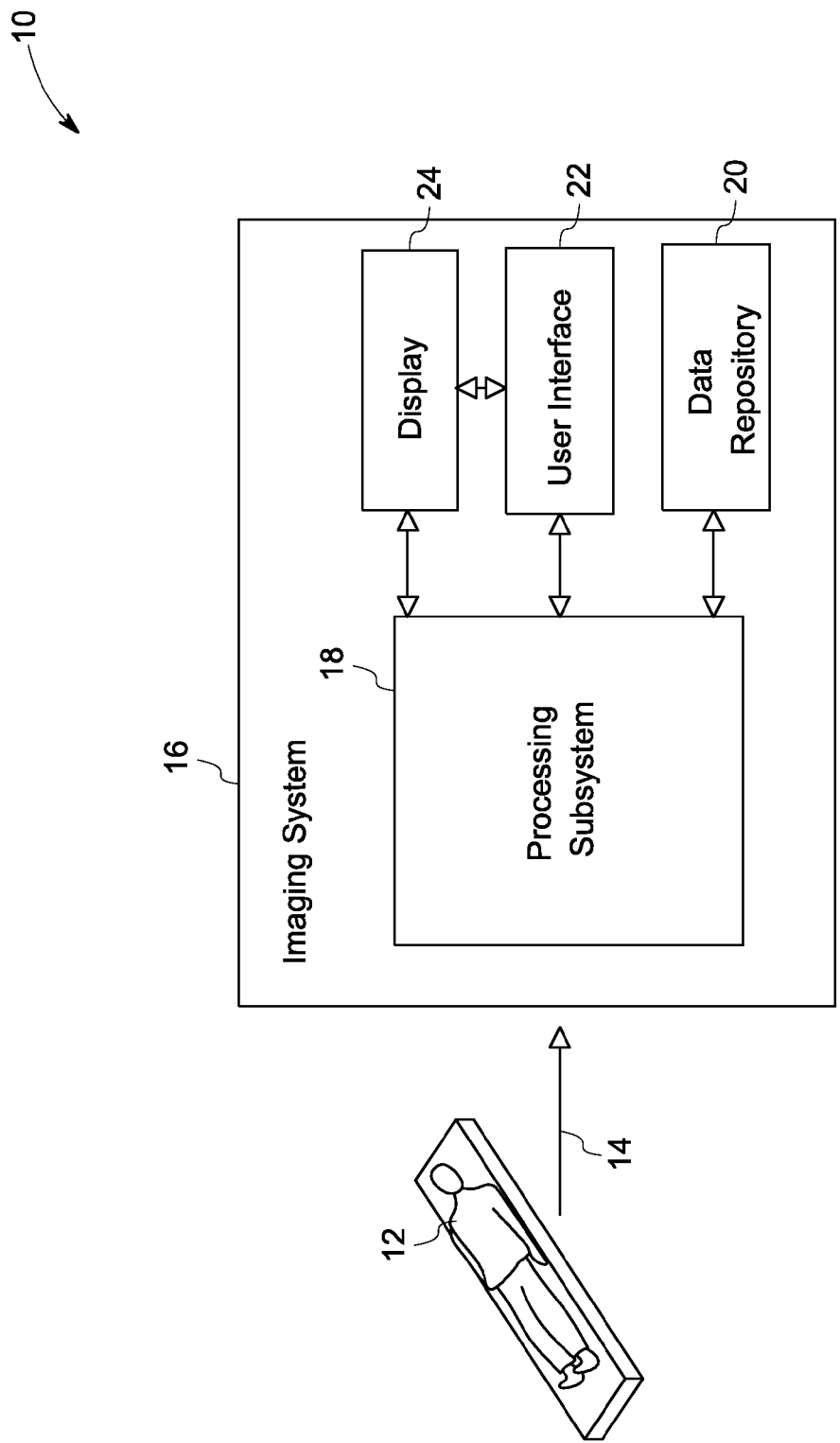
FIG. 1 is a block diagram of an exemplary system for processing data signals, in accordance with aspects of the present technique.
Figure 5:
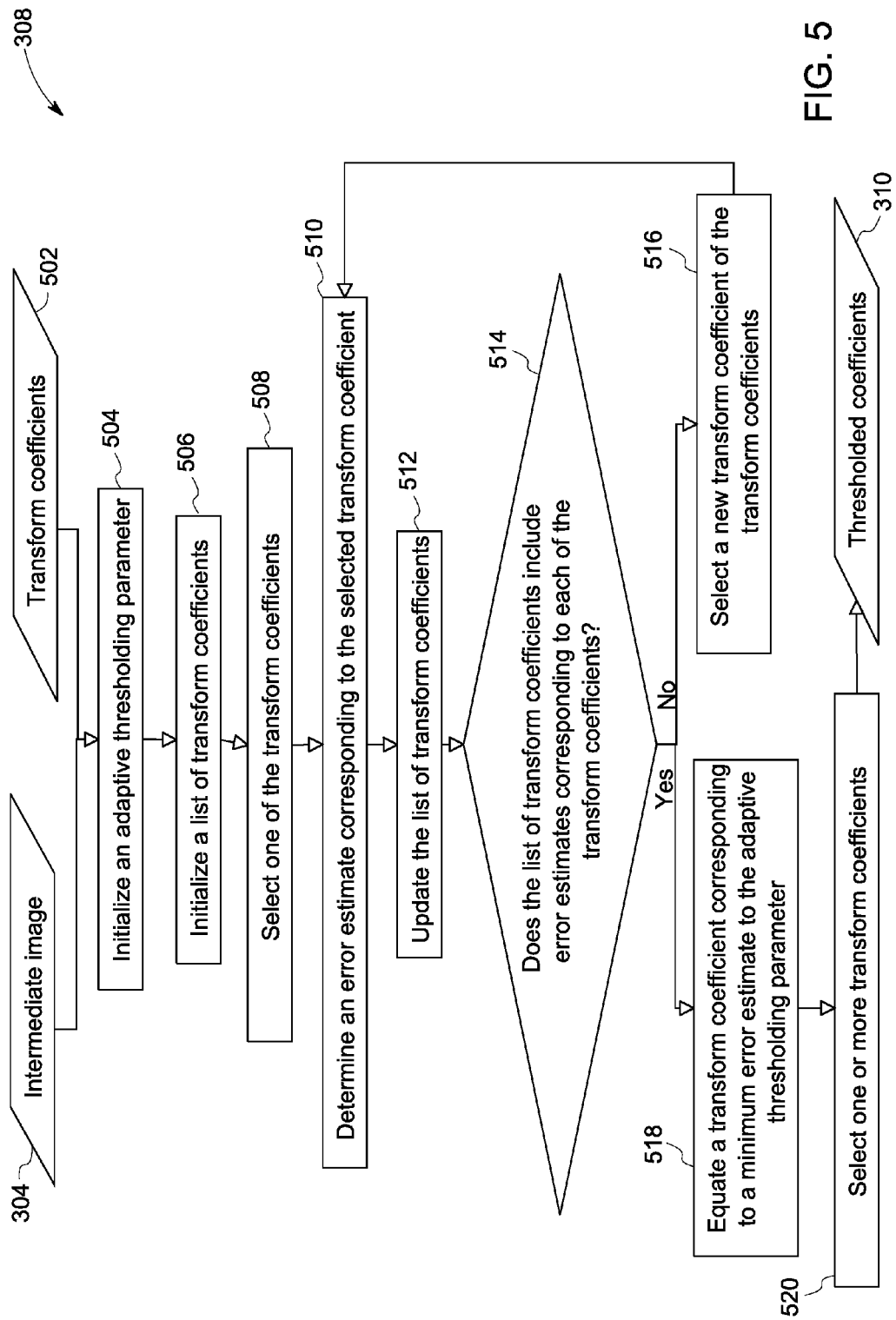
Figure 6:
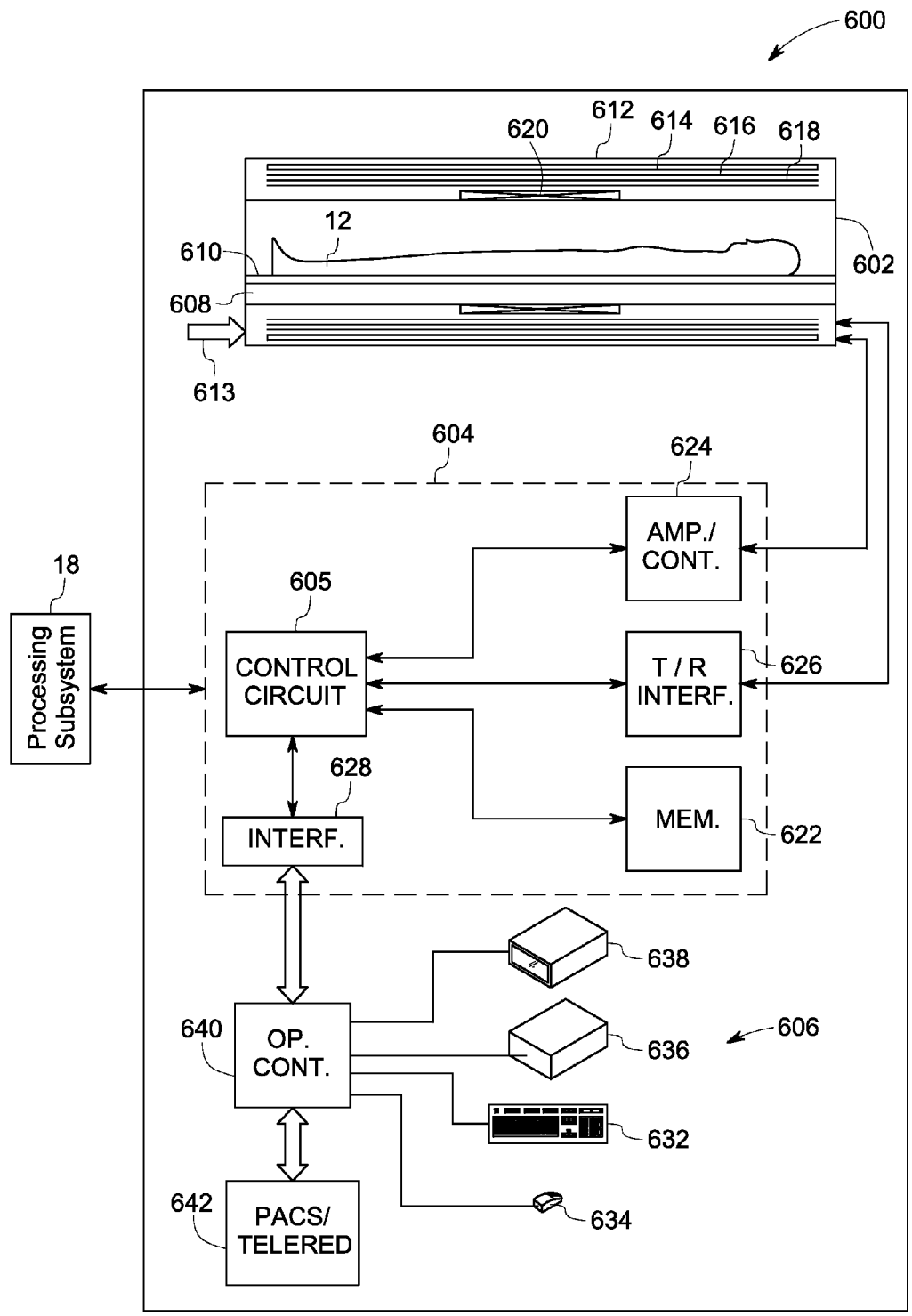

FIG. 5 is a flow chart illustrating an exemplary method for adaptively thresholding one or more transform coefficients to determine one or more thresholded coefficients, in accordance with aspects of the present technique; and FIG. 6 is a block diagram illustrating an embodiment of an exemplary magnetic resonance imaging system for use in the imaging system of FIG. 1, in accordance with aspects of the present technique.

DETAILED DESCRIPTION

Embodiments of the present techniques and system reconstruct a data signal by processing acquired data. The acquired data, for example, may include audio data, video data, image data, or the like. The processing of the acquired data includes generation of a plurality of selected coefficients corresponding to the acquired data. The plurality of selected coefficients is utilized for the reconstruction of the data signal with reduced error and noise. The plurality of selected coefficients is generated by adaptive thresholding of one or more transform coefficients that results in determination of one or more thresholded coefficients. The one or more thresholded coefficients are selected as the plurality of selected coefficients when the thresholded coefficients satisfy a stopping criteria.

The adaptive thresholding of the transform coefficients results in the determination of the one or more thresholded coefficients in a data driven manner. Furthermore, the one or more thresholded coefficients may be used as the plurality of selected coefficients for reconstructing the data signal. Accordingly, the data signal is reconstructed in a data driven manner that reduces any required human intervention. In addition, the present techniques determine a linear combination of the last two estimated image solutions and determines the one or more thresholded coefficients based upon the linear combination solution. Thus, the utilization of the linear combination of the last two estimated images results in a faster convergence to the reconstructed data signal.

FIG. 1 is a block diagram of an exemplary system 10 for processing data signals. The data signals, for example, may represent audio data, video data, image data, and the like. For ease of understanding, the present technique will be described with reference to image data, however it may be noted that the present techniques may also find application with other data, such as, but not limited to, audio data, image data, video data, and the like.

As shown in the presently contemplated configuration, the system 10 may be configured to acquire undersampled data 14 from an object 12. The term "undersampled data" is used herein to refer to an acquired image data in which the number of sample points acquired is less than those required by Nyquist's sampling criterion to match desired image quality metrics, such as, resolution of the desired image/signal, field of view, and the like. In one embodiment, the undersampled data 14 may be acquired by randomly down-selecting the data sample locations. By way of an example, the random down-selection, for example, may include a uniform random order data selection, utilization of probability density functions, or combinations thereof.

Furthermore, the system 10 may include an imaging system 16 that receives the undersampled data 14. The imaging system 16, for example, may represent an industrial imaging system, a non-destructive evaluation and inspection system, a multi-modality imaging system, a Computed Tomography (CT) Imaging system, a Positron Emission Tomography system (PET), a Single Photon Emission Computed Tomography system (SPECT), a Magnetic resonance imaging (MRI) system, or the like. As shown in FIG. 1, the imaging system 16 includes a processing subsystem 18 that processes the undersampled data 14 to reconstruct a data signal. In one embodiment, the reconstructed data signal may represent a resultant image. As used herein, the term "resultant image" is used to refer to an image corresponding to an object that may be reconstructed using the present techniques.

In addition, the processing subsystem 18 generates a plurality of selected coefficients associated with the undersampled data 14. The term "plurality of selected coefficients" is used herein to refer to one or more thresholded coefficients that may be used to reconstruct a data signal that has reduced error or noise. The term "thresholded coefficients" is used herein to refer to one or more transform (e.g. wavelet) coefficients that are adaptively thresholded from a set of transform coefficients corresponding to an undersampled data. The term "adaptively thresholding/thresholded" is used herein to refer to a selection of one or more transform coefficients corresponding to an acquired data or undersampled data based upon the acquired data or the undersampled data. Moreover, the processing subsystem 18 may also be configured to reconstruct the resultant image using the plurality of selected coefficients. The determination of the thresholded coefficients, the plurality of selected coefficients and the reconstruction of the resultant image using the plurality of selected coefficients will be explained in greater detail with reference to FIGS. 2-5.

In certain embodiments, the imaging system 16 may also be coupled to a data repository 20, which may be configured to receive and store the undersampled data 14, the resultant image, an intermediate image or a transitional image determined during the processing of the undersampled data 14. The imaging system 16 may also include a user interface 22 and a display 24. The display 24, for example, may display resultant images, intermediate images, and transitional images determined during the processing of the undersampled data 14. Furthermore, in accordance with aspects of the present technique, the user interface 22 may aid in manipulating and/or organizing resultant images, intermediate images or transitional images displayed on the display 24.

Figure 2:
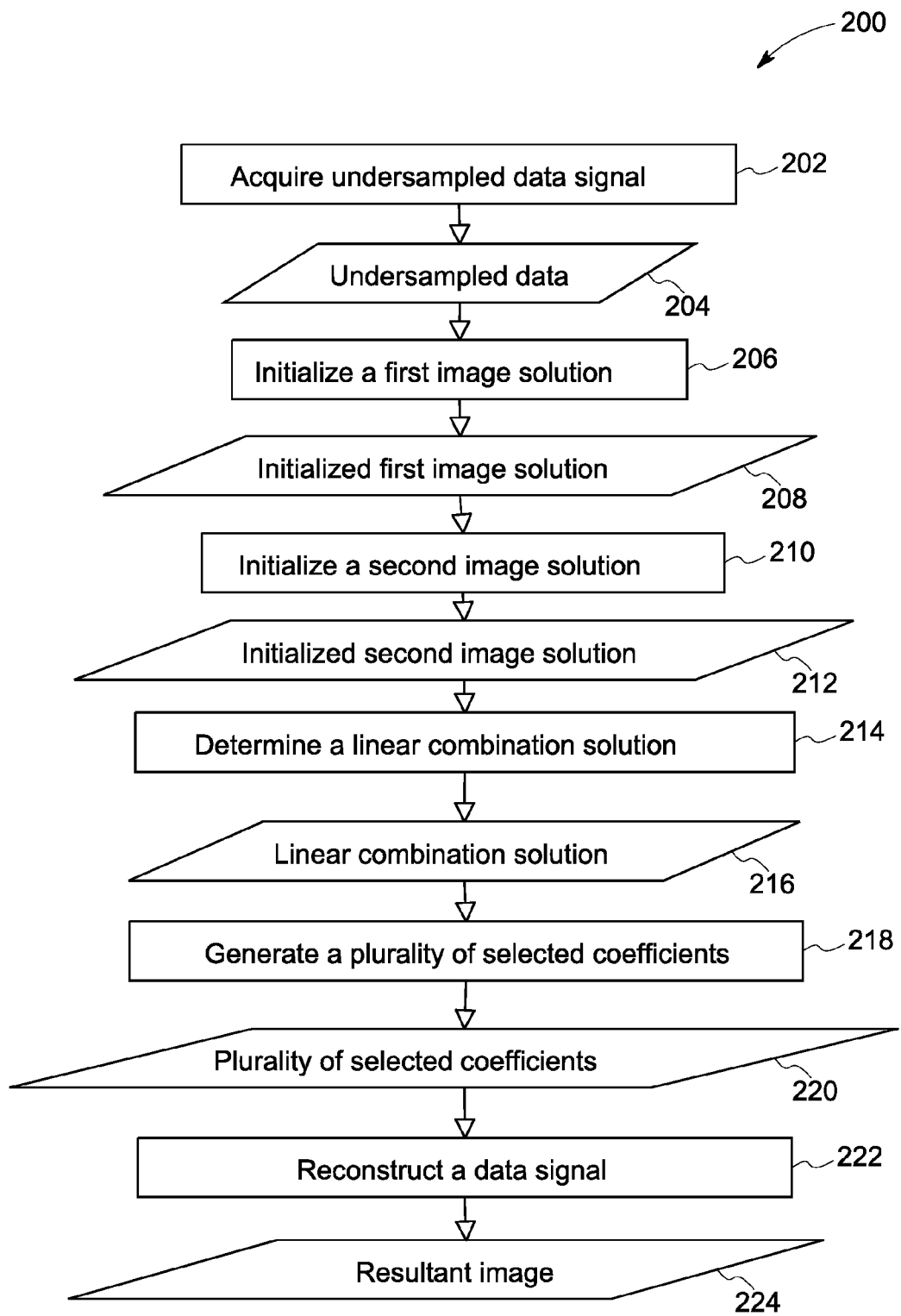
FIG. 2 is a flow chart illustrating an exemplary signal processing method, in accordance with aspects of the present technique.

Turning now to FIG. 2, a flow chart 200 illustrating an exemplary signal processing method, in accordance with aspects of the present technique, is depicted. Although the method for processing data signals described in FIG. 2 is described with reference to processing of image signals, it will be appreciated that the signal processing method may also find application in processing of video signals, audio signals, and the like. It may be noted that the data signals may be processed in parallel using the present method by parallel processors, parallel computing machines, and the like.

The method starts at step 202, where undersampled data signals are acquired. The undersampled data signals may represent undersampled data 204. In one embodiment, the undersampled data 204 may be the undersampled data 14. For example, the undersampled data 204 may be acquired by the imaging system 16, (see FIG. 1). Moreover, in one embodiment, the undersampled data 204 may be acquired by randomly down-selecting data sample locations. By way of an example, the random down-selection may include a uniform random order data selection, utilization of probability density functions, or combinations thereof. Subsequently, as indicated by step 206, a first image solution may be initialized to determine an initialized first image solution 208. In addition, at step 210, a second image solution may be initialized to determine an initialized second image solution 212. As used herein, the term "image solution" is used to refer to an estimate or supposition of a resultant image corresponding to an object. Accordingly, the first image solution refers to a first estimate of the resultant image and the second image solution refers to a second estimate of the resultant image. Furthermore, the term "resultant image" is used to refer to an image corresponding to an object that may be reconstructed using the present techniques. Moreover, in certain embodiments, the first image solution and the second image solution may be initialized to null at steps 206 and 210. In one embodiment, the first image solution and the second image solution may be initialized automatically by the imaging system 16. In another embodiment, the first image solution and the second image solution may be initialized manually by a user via use of the imaging system 16, the user interface 22 and the display device 24.

Furthermore, at step 214, a linear combination solution 216 is determined based upon the initialized first image solution 208 and the initialized second image solution 212. In one embodiment, the linear combination solution 216 may be a linear combination of the initialized first image solution 208 and the initialized second image solution 212. The linear combination solution 216, for example, may be determined by the processing subsystem 18. By way of a non-limiting example, when a first image solution is represented by $f^{n-1}$ and a second image solution is represented by $f^n$, then a linear combination solution g may be represented as shown by equation (1):

$$g^n = a(n)f^{n-1} + b(n)f^n \quad (1)$$

where a and b are variables and are functions of the iteration number at which the linear combination solution $g^n$ is determined. For example, when the linear combination solution is determined in the first iteration, then the value of n may be substituted to be equivalent to 1 in equation (1). In certain embodiments, the variables a(n) and b(n) may be determined utilizing the following equations (2) and (3):

$$a(n) = 1 + (n-1)/(n+2) \quad (2)$$

$$b(n) = -(n-1)/(n+2) \quad (3)$$

where a and b are variables, and n is the iteration number wherein the linear combination solution is determined. It may be noted that for ease of understanding, the determination of the values of a(n) and b(n) are shown via exemplary equations (2) and (3), however, other equations may be used for generation of the variables a(n) and b(n).

Subsequent to the determination of the linear combination solution 216, a plurality of selected coefficients 220 may be generated at step 218. The plurality of selected coefficients 220, for example, may be generated by iteratively updating the first image solution, the second image solution and the linear combination solution to determine thresholded coefficients. The thresholded coefficients, for example, may be determined by adaptively thresholding one or more transform coefficients. The generation of the plurality of selected coefficients will be explained in greater detail with reference to FIG. 3. Furthermore, at step 222, a data signal may be reconstructed. The reconstructed data signal may be used to represent a resultant image 224. The data signal may be reconstructed using the plurality of selected coefficients 220. In one embodiment, the data signal may be reconstructed utilizing the following equation (4):

$$q = \sum_{n=0}^{N-1} \alpha_n \phi_n \quad (4)$$

where q is a reconstructed data signal having N pixels, $\alpha_n$ is representative of a thresholded coefficient in a plurality of selected coefficients wherein the thresholded coefficient corresponds to a wavelet $\phi_n$.

Figure 3:
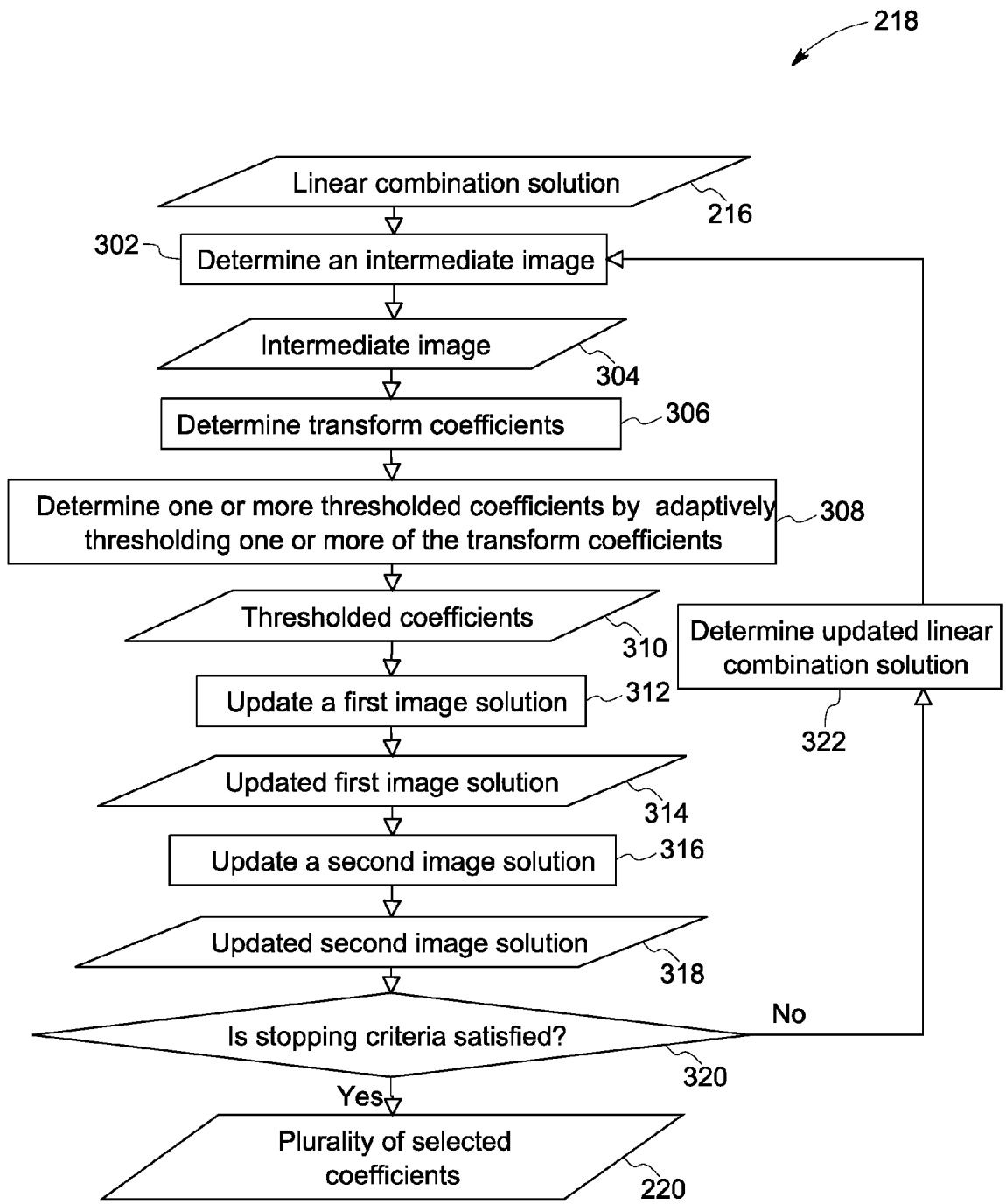
FIG. 3 is a flow chart illustrating an exemplary method of determining a plurality of selected coefficients, in accordance with aspects of the present technique.

Referring now to FIG. 3, a flow chart 218 illustrating an exemplary method for generating the plurality of selected coefficients 220, in accordance with aspects of the present technique, is depicted. As shown in FIG. 3, reference numeral 216 may be representative of the linear combination solution determined at step 214 of FIG. 2. The method starts at step 302 where an intermediate image solution 304 is determined. As used herein, the term "intermediate image solution" is used to refer to an intermediate image that may be further used for reconstructing the resultant image 224 (see FIG. 2). In one embodiment, the intermediate image solution 304 may be determined by the imaging system 16 (see FIG. 1). Hereinafter, the terms "intermediate image" and "intermediate image solution" may be used interchangeably. The determination of the intermediate image 304 may be understood in greater detail with reference to FIG. 4.

Figure 4:
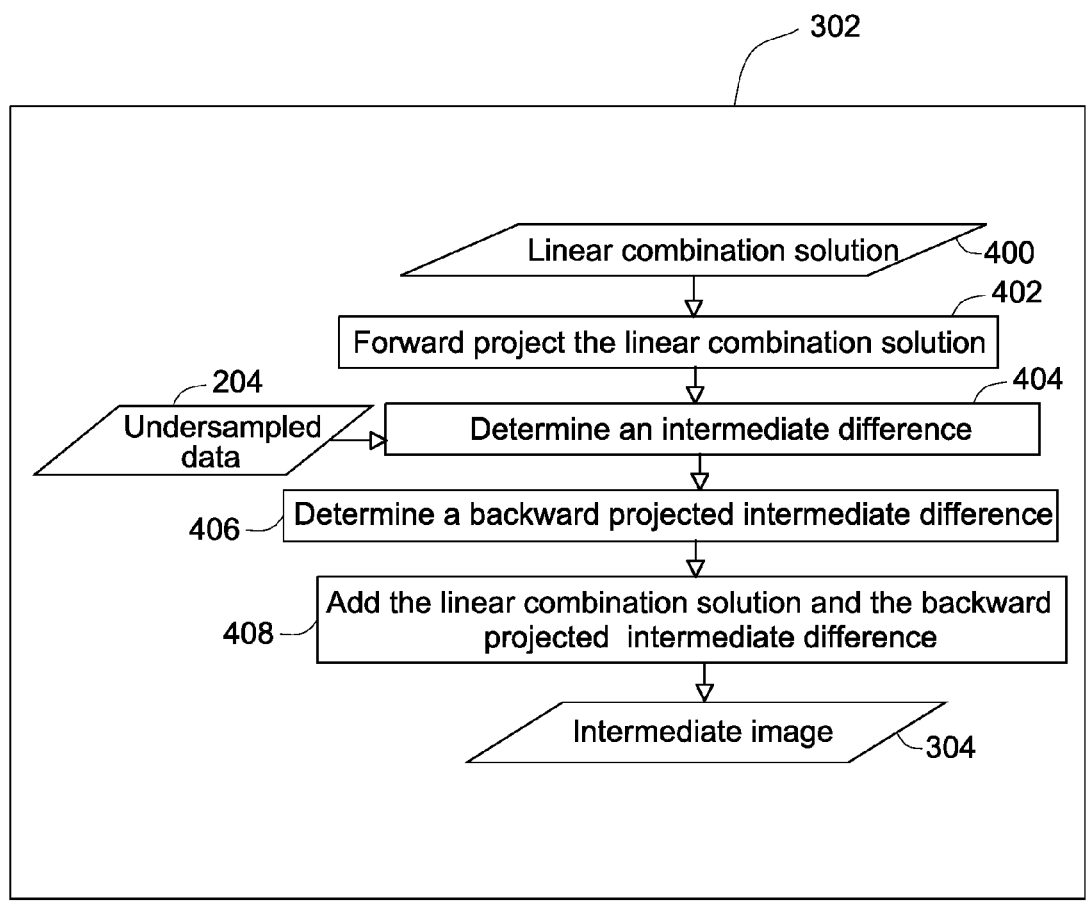
FIG. 4 is a flow chart illustrating an exemplary method of determining an intermediate image, in accordance with aspects of the present technique.

Turning now to FIG. 4, a flow chart 302 illustrating a method of determining the intermediate image 304, in accordance with aspects of the present technique, is depicted. Reference numeral 400 may be representative of a linear combination solution. In one embodiment, the linear combination solution 400 may be the linear combination solution 216 that was determined at step 214 of FIG. 2 (also shown in FIG. 3). In another embodiment, the linear combination solution 400 may be an updated linear combination solution. The method starts at step 402 where the linear combination solution 400 is forward projected resulting in a forward projected linear combination solution. In certain embodiments, the forward projection of the linear combination solution 400 may further include undersampling of the forward projected linear combination solution. The undersampling of the forward projected linear combination solution, for example, may include undersampling the forward projected linear combination solution at locations substantially similar to the undersampled locations of undersampled data 204 (see FIG. 2). Further to the determination of the forward projected linear combination solution, an intermediate difference is determined at step 404. The intermediate difference may be determined utilizing the forward projected linear combination solution and the undersampled data 204. More particularly, the intermediate difference may be determined by subtracting the forward projected linear combination solution from the undersampled data 204. In one embodiment, the intermediate difference may be determined utilizing the following equation (5):

$$\text{Inter\_diff}(n) = x - P(g^n) \quad (5)$$

where Inter_diff (n) is representative of an intermediate difference, x is representative of the undersampled data, P is representative of a forward projection with restriction to the undersampling locations, and $g^n$ is representative of a linear combination solution of a first image solution and a second image solution and n is representative of the iteration number.

Subsequently at step 406, a backward projection of the intermediate difference is determined resulting in a backward projected intermediate difference.

$$\text{Back\_projected\_diff} = P^H(x - P(g^n))$$

where Back_projected_diff is representative of a backward projected intermediate difference, $P^H$ is representative of a backward projection, x is representative of the undersampled data, P is representative of a forward projection with restriction to the undersampling locations, and $g^n$ is representative of a linear combination solution of a first image solution and a second image solution, and n is representative of the iteration number.

Further to the determination of the backward projected intermediate difference at step 406, the linear combination solution 400 may be added to the backward projected intermediate difference as indicated by step 408 to determine the intermediate image 304. The steps 402 to 408 that are processed to determine the intermediate image 304 may be represented by the following equation (6).

$$I^n = g^n + P^H(x - P(g^n)) \quad (6)$$

where $I^n$ is representative of an intermediate image, $P^H$ is representative of a backward projection, x is representative of the undersampled data, P is representative of a forward projection with restriction to the undersampling locations, and $g^n$ is representative of a linear combination solution of a first image solution and a second image solution and n is representative of the iteration number.

With returning reference to FIG. 3, at step 306, transform coefficients corresponding to the intermediate image 304 are determined. More particularly, at step 306, transform coefficients may be determined by applying a transformation technique to the intermediate image 304. The transformation technique, for example, may include a wavelet transformation technique, a gradient transformation technique, and the like. In accordance with one embodiment, the transform coefficients may be determined utilizing the following equations (7) or (8):

$$\text{trans\_coefficients}^n = WT[I^n] \quad (7)$$

$$\text{trans\_coefficients}^n = WT[g^n + [P^H(x - P(g^n))]] \quad (8)$$

where $\text{trans\_coefficients}^n$ is representative of transform coefficients, $I^n$ is representative of an intermediate image, WT is representative of a wavelet transformation operation, $g^n$ is representative of a linear combination solution of a first image solution, $P^H$ is representative of a backward projection and x is representative of the undersampled data, P is representative of a forward projection with restriction to the undersampling locations.

Furthermore in accordance with aspects of the present technique, one or more thresholded coefficients 310 are determined at step 308. The thresholded coefficients 310 may be determined by adaptively thresholding one or more of the transform coefficients that are determined at step 306. The determination of thresholded coefficients by adaptively thresholding one or more transform coefficients may be understood in greater detail with reference to FIG. 5.

Referring now to FIG. 5, a flow chart 308 illustrating a method for determining one or more thresholded coefficients, in accordance with aspects of the present technique, is depicted. As shown in FIG. 5, reference numeral 304 is representative of the intermediate image that is determined at step 302 of FIG. 3 (also shown in FIG. 4). Furthermore, reference numeral 502 is representative of one or more transform coefficients corresponding to the intermediate image 304, which may be determined at step 306 of FIG. 3.

The method starts at step 504 where an adaptive thresholding parameter is initialized. The adaptive thresholding parameter, for example, may be initialized to zero. The term "adaptive thresholding parameter" is used herein to refer to a variable that varies its value based upon the numerical values of transform coefficients and that may be used to determine thresholded coefficients. Furthermore, at step 506 a list of transform coefficients may be initialized. The list of transform coefficients may be initialized by including each of the transform coefficients 502 in the list of transform coefficients. Subsequent to the initialization of the list of transform coefficients, one of the transform coefficients 502 is selected at step 508. In certain embodiments, the transform coefficient may be selected randomly.

Subsequently, at step 510 an error estimate corresponding to the selected transform coefficient is determined using the intermediate image 304 and an expected image. As used herein, the term "error estimate" is used to refer to a difference of an intermediate image solution and an expected image solution corresponding to one or more transform coefficients that are selected by using a selected transform coefficient as a threshold. Furthermore, the term "expected image solution" may be used to refer to an image corresponding to one or more transform coefficients that are selected using a selected transform coefficient as a threshold. The error estimate, for example, may be determined by subtracting an expected image solution from the intermediate image solution 304. The error estimate corresponding to the selected transform coefficient may be determined based upon the following equation (9):

$$E(w) = \|\tilde{I} - I^n\|^2 \quad (9)$$

where E(w) is an error estimate corresponding to the selected transform coefficient w is used as a thresholding parameter, $\tilde{I}$ is an expected image solution and $I^n$ is an intermediate image that is determined based upon the selected transform coefficient w.

As shown in FIG. 5, at step 512 the list of transform coefficients is updated. The list of transform coefficients, for example, may be updated by including the error estimate corresponding to the selected transform coefficient in the list of transform coefficients. Furthermore, at step 514 a check may be carried out to determine if the list of transform coefficients includes error estimates corresponding to each of the transform coefficients 502. At step 514, if it is determined that the list of transform coefficients does not include error estimates corresponding to each of the transform coefficients 502, then the control is transferred to step 516. At step 516, a new transform coefficient is selected from the transform coefficients 502. The new transform coefficient is a transform coefficient that has not been selected previously from the transform coefficients 502. More particularly, the new transform coefficient is one of the transform coefficients 502 for which an error estimate does not exist in the list of transform coefficients.

Moreover, subsequent to the selection of the new transform coefficient at step 516, the control is transferred back to step 510. As previously noted, at step 510 an error estimate corresponding to the new transform coefficient is determined. Also, subsequent to the determination of the error estimate corresponding to the new transform coefficient, the steps 512-514 may be iterated to determine whether the list of transform coefficients has been updated to include error estimates corresponding to each of the transform coefficients 502. If at step 514, it is determined that the list of transform coefficients has been updated to include error estimates corresponding to each of the transform coefficients 502, then the control is transferred to step 518.

At step 518, a transform coefficient that corresponds to a minimum error estimate in the list of transform coefficients is selected as an adaptive thresholding parameter. For example, if the list of transform coefficients includes five transform coefficients $w_1$, $w_2$, $w_3$, $w_4$, $w_5$ and the transform coefficient $w_3$ corresponds to a minimum error estimate in comparison to the other transform coefficients $w_1$, $w_2$, $w_4$, $w_5$, then the transform coefficient $w_3$ may be equated to the adaptive thresholding parameter as shown in the following equation (10):

$$\lambda = w_3 \quad (10)$$

where $\lambda$ is representative of an adaptive thresholding parameter.

Furthermore, at step 520 one or more of the transform coefficients 502 are selected utilizing the adaptive thresholding parameter. The selected one or more transform coefficients, for example, may be selected by comparing the numerical value of the adaptive thresholding parameter with the numerical values of each of the transform coefficients 502. In one embodiment, the transform coefficients may be selected by application of a hard thresholding operation, a soft thresholding operation, and the like on the transform coefficients 502. By way of an example, when a soft thresholding operation is applied on a set of transform coefficients, such as the transform coefficients 502, then one or more transform coefficients that have numerical values greater than the adaptive thresholding parameter may be selected. For example, when the transform coefficients 502 include the five transform coefficients $w_1$, $w_2$, $w_3$, $w_4$, $w_5$ and the adaptive thresholding parameter $\lambda$ is equal to the third transform coefficient $w_3$, then the transform coefficients $w_1$ and $w_2$ that have the numerical values greater than the adaptive thresholding parameter $\lambda$ may be selected. In one embodiment, the soft thresholding operation may be applied utilizing the following equation (11).

$$T_{\lambda(n)} w = (abs(w) > \lambda) * (abs(w) - 2) * \exp(i \, arg(w)) \quad (11)$$

where $\lambda$ is representative of an adaptive thresholding parameter, n is representative of the iteration number and w is representative of a transform coefficient.

In another embodiment, when a hard thresholding operation is applied on a set of transform coefficients, such as the transform coefficients 502, then one or more transform coefficients in the set of transform coefficients that have the numerical values greater or equal to the adaptive thresholding parameter $\lambda$ are selected. For example, when the transform coefficients 502 include the five transform coefficients $w_1$, $w_2$, $w_3$, $w_4$, $w_5$ and the adaptive thresholding parameter $\lambda$ is equal to the third transform coefficient $w_3$, then the transform coefficients $w_1$, $w_2$ and $w_3$ that have the numerical values greater than or equal to the adaptive thresholding parameter $\lambda$ are selected. The hard thresholding operation may be applied on a set of transform coefficients by utilizing the following equation (12):

$$T_{\lambda(n)} w = (abs(w) > \lambda) * (abs(w) - 2) * \exp(i \, arg(w)) \quad (12)$$

where $\lambda$ is representative of an adaptive thresholding parameter, n is representative of the iteration number and w is representative of a transform coefficient.

Consequent to the selection of the one or more transform coefficients at step 520, the thresholded coefficients 310 are determined. More particularly, the one or more transform coefficients that are selected utilizing the adaptive thresholding parameter at step 520 are the thresholded coefficients 310. Referring back to FIG. 3, subsequent to the determination of the thresholded coefficients 310, at step 312 a first image solution may be updated to determine an updated first image solution 314. In one embodiment, the first image solution may be the initialized first image solution 208 (see FIG. 2). In another embodiment, the first image solution may be the updated first image solution 314 that was updated at the step 312 in the iteration previous to the current iteration. The first image solution is updated by equating a second image solution to the first image solution. In one embodiment, the second image solution, for example, may be the initialized second image solution 212 (see FIG. 2). By way of an example, if a second image solution is represented by $f^2$ and a first image solution is represented by $f^1$, then the first image solution may be updated as follows:

$$f^1 = f^2 \quad (13)$$

It may be noted that equating the second image solution to the first image solution results in storing the latest determined second image solution. Furthermore, at step 316, a second image solution may be updated to determine an updated second image solution 318. In one embodiment, the second image solution may be the initialized second image solution 212 (see FIG. 2). In another embodiment, the second image solution may be the updated second image solution 318 that was obtained at an iteration previous to the current iteration. The second image solution, for example, may be updated by determining an inverse transformation of the thresholded coefficients 310 that have been determined at step 308. In one embodiment, the second image solution may be updated utilizing the following equation (14):

$$f^{n+1} = IWT(Th) = IWT\{T_{\lambda(n)}\{WT[g^n + [P^H(x - P(g^n))]]\}\} \quad (14)$$

where $f^{n+1}$ is an updated second image solution, IWT is representative of inverse wavelet transformation, T is representative of a thresholding operation, $\lambda$ is representative of an adaptive thresholding parameter, n is representative of the iteration number, WT is representative of a wavelet transformation operation, $g^n$ is representative of a linear combination solution of a first image solution $f^{n-1}$ and a second image solution $f^n$, $P^H$ is representative of a backward projection and x is representative of the undersampled data, and P is representative of a forward projection with restriction to the undersampling locations.

Furthermore, at step 320 a check is carried out to determine whether a stopping criteria is satisfied. In one embodiment, the stopping criteria is used to determine if the thresholded coefficients 310 may be used to reconstruct the resultant image 224 (see FIG. 2) with a reduced error estimate or noise. In one embodiment, the determination at step 320 includes determining if a norm difference of the undersampled data 204 (see FIG. 2) and the updated second image solution 318 that is determined at step 316 is less than a determined value. The norm, for example, includes a L1-norm or a L2-norm. In one embodiment, the stopping criteria may be represented as follows:

$$Stopcrir = \|x - P(f^{n+1})\| \quad (15)$$

where Stopcrir is representative of a stopping criteria, n is representative of the iteration number, x is representative of the undersampled data of an object, and $f^{n+1}$ is representative of an updated second image solution.

As shown in the presently contemplated configuration, at step 320 if it is determined that the stopping criteria is not satisfied, then the control is transferred to step 322, where an updated linear combination solution is determined. The updated linear combination solution is determined by determining a linear combination of the updated first image solution 314 and the updated second image solution 318. The updated linear combination solution of the updated first image solution 314 and the updated second image solution 318, for example, may be determined by utilizing the equations (1) to (3). Accordingly, the determination of the updated linear combination solution based upon the updated first image solution 314 and the updated second image solution 318 results in a determination of the updated linear combination solution based upon the last two image solutions.

Subsequent to the determination of the updated linear combination solution, the control may be transferred back to step 302. At step 302, the updated linear combination solution is used to determine the intermediate image 304. Furthermore, by processing the steps 302 to 308, the thresholded coefficients 310 are determined using the updated linear combination solution. It may be noted that the determination of the thresholded coefficients based upon the updated linear combination solution results in a faster convergence to the resultant image 224. More particularly, the determination of the thresholded coefficients based upon the last two updated image solutions results in the faster convergence to the resultant image 224. In addition, at steps 312 and 316, the latest obtained updated first image solution 314 and updated second image solution 318 are again updated. Furthermore, the iteration of steps 302-324 continues until the stopping criteria is satisfied at step 320.

At step 320, if the stopping criteria is satisfied, then the plurality of selected coefficients 220 (see FIG. 2) is generated. Accordingly, in the presently contemplated configuration, the plurality of selected coefficients 220 include the thresholded coefficients that are determined at the $n^{th}$ iteration wherein the stopping criteria is satisfied. More particularly, the plurality of selected coefficients 220 include the thresholded coefficients that correspond to an updated second image solution 318 that satisfies the stopping criteria at step 320. In one embodiment, the latest determined updated second image solution 318 that satisfies the stopping criteria at step 320 may be represented as follows:

$$f^{n+1} = IWT(T_{\lambda(n)}\{WT[g^n + P^H(x - P(g^n))]\}) \quad (16)$$

where $f^{n+1}$ is representative of an updated second image solution for each of the possible iterations, n is representative of the iteration number, IWT is representative of an inverse wavelet transformation operation, T is representative of a thresholding operation, $\lambda$ is representative of an adaptive thresholding parameter, WT is representative of a wavelet transformation operation, $P^H$ is representative of a backward projection, x is representative of the undersampled data and $g^n$ is representative of a linear combination solution of a first image solution $f^{n-1}$ and a second image solution $f^n$. In an embodiment, if the stopping criteria is satisfied at an $n^{th}$ iteration, then a plurality of selected coefficients are generated based upon the thresholded coefficients that are determined at the $n^{th}$ iteration. Accordingly it may be noted that the latest determined thresholded coefficients that correspond to an updated second image solution that satisfies the stopping criteria may be declared as a plurality of selected coefficients.

As noted with reference to FIG. 1, the imaging system 16 may include a Magnetic Resonance Imaging System (MRI), a Computed Tomography (CT) Imaging System, a Positron Emission Tomography (PET), a Single Photon Emission Computed Tomography (SPECT) Imaging System, or combinations thereof. Furthermore, the techniques described with reference to FIGS. 2-5 may be employed in such systems. Referring now to FIG. 6, a diagrammatical view of an exemplary magnetic resonance imaging (MRI) system 600 that employs the present techniques to reconstruct a resultant image in accordance with aspects of the present technique, is depicted. The MRI system 600 is illustrated diagrammatically as including a scanner 602, scanner control circuitry 604 and system control circuitry 606. While the MRI system 600 may include any suitable MRI scanner or detector, in the illustrated embodiment the MRI system 600 is shown as including the full body scanner 602 including a bore 608 into which a table 610 may be positioned to place an object 12, such as a patient, in a desired position for scanning.

Additionally, the scanner 602 may include a series of associated coils for producing controlled magnetic fields, for generating radio-frequency (RF) excitation pulses, and for detecting emissions or signals from gyromagnetic material within the object 12 in response to such pulses. In the diagrammatical view of FIG. 6, a primary magnet coil 612 may be provided for generating a primary magnetic field generally aligned with the bore 608. A power supply 613 is provided for energizing the primary magnet coil 612. A series of gradient coils 614, 616 and 618 may be grouped in a coil assembly for generating controlled magnetic gradient fields during examination sequences of the object 12. A RF coil 620 may be provided for generating the RF pulses for exciting the gyromagnetic material in the object 12. During the examination sequence, a RF frequency pulse is generated at or near the Larmor frequency of the material of interest, resulting in a rotation of the net aligned moment to produce a net transverse magnetic moment. This transverse magnetic moment precesses around the main magnetic field direction, emitting the signals that are acquired by the scanner 602 and processed for reconstruction of the resultant image, such as, the resultant image 224 (see FIG. 2).

The coils of the scanner 602 are controlled by the scanner control circuitry 604 to generate the desired magnetic field and RF pulses. In the diagrammatical view of FIG. 6, the control circuitry 604 is shown as including a control circuit 605 for commanding the pulse sequences employed during the examinations. Also, the scanner control circuitry 604 may further include memory circuitry 622 for storing physical and logical axis configuration parameters, examination pulse sequence descriptions, acquired image data, programming routines, and so forth, used during the examination sequences implemented by the scanner 602. Interface between the control circuit 604 and the coils 612, 614, 616, 618, 620 of the scanner 602 is managed by amplification and control circuitry 624 and by transmission and receive interface circuitry 626. Finally, the scanner control circuitry 604 may include interface components 628 for exchanging configuration and image data with the system control circuitry 606.

The MRI system 600 further includes a signal processing subsystem, such as, the processing subsystem 18 (see also FIG. 1). In a presently contemplated configuration, the processing subsystem 18 is shown as being in operative association with the scanner control circuitry 604. In certain embodiments, the processing subsystem 18 may be a component of the scanner control circuitry 604. In one embodiment, the processing subsystem 18 receives the acquired signals from the scanner control circuit 604. Furthermore, the processing subsystem 18 may process the acquired signals to generate a plurality of selected coefficients, such as, the plurality of selected coefficients 220 (see FIG. 2). The processing subsystem 18 reconstructs a resultant image, such as, the resultant image 224 (see FIG. 2) utilizing the plurality of selected coefficients. The processing subsystem 18 processes the acquired signals and reconstructs the resultant image utilizing the techniques described with reference to FIGS. 2-5. It may be noted that while in the presently contemplated configuration the MRI system 600 is shown as including a single processing subsystem 18, the MRI system 600 may include a plurality of processing subsystems. The plurality of processing subsystems may process the acquired signals in parallel to generate the plurality of selected coefficients in parallel.

Furthermore, the system control circuitry 606 may include a wide range of devices for facilitating interface between an operator or radiologist and the scanner 602 via the scanner control circuitry 604. Further, the system control circuitry 606 may include various interface and peripheral drivers for receiving and exchanging data with local and remote devices. The interface and peripheral devices, for example, may include a keyboard 632, a mouse 634, a printer 636, a computer monitor 638, or the like. In addition, the system 600 may include various local and remote image access and examination control devices, represented generally by reference numeral 640 in FIG. 6. Such devices may include picture archiving and communication systems (PACS) 642, teleradiology systems, and the like.

The method and system for signal processing described hereinabove provides an exemplary compressed sensing technique that reduces processing time. The exemplary compressed sensing technique advantageously enhances computational efficiency of signal processing, while substantially reducing memory requirements. Furthermore, the method for signal processing minimizes usage of complicated cost functions. The present techniques determine a linear combination of the last two estimated images or the estimated image solutions and determines thresholded coefficients based upon the linear combination solution. Thus, the utilization of the linear combination of the last two estimated images results in a faster convergence to a resultant image. Furthermore, the present techniques determine the thresholded coefficients by adaptively thresholding one or more transform coefficients based upon the numerical values of the transform coefficients. Accordingly, the present techniques reconstructs the resultant image in a data driven way and thus, reduces the human intervention typically required for adjustment of one or more parameters based upon an acquired data.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A signal processing method, comprising:
acquiring undersampled data corresponding to an object;
initializing a first image solution and a second image solution;
determining a linear combination solution based upon the first image solution and the second image solution;
generating a plurality of selected coefficients by iteratively updating the first image solution, the second image solution and the linear combination solution and adaptively thresholding one or more transform coefficients utilizing the undersampled data, an updated first image solution, an updated second image solution and an updated linear combination solution; and
reconstructing a data signal using the plurality of selected coefficients.

2. The method of claim 1, wherein acquiring the undersampled data comprises acquiring data via use of random data selection, uniform random order data selection, utilization of probability density functions, or combinations thereof.

3. The method of claim 1, wherein determining the linear combination solution comprises determining a linear combination of the initialized first image solution and the initialized second image solution.

4. The method of claim 1, wherein updating the linear combination solution comprises determining a linear combination of the updated first image solution and the updated second image solution.

5. The method of claim 1, wherein generating the plurality of selected coefficients comprises:
determining an intermediate image utilizing the undersampled data and the updated linear combination solution;
determining transform coefficients corresponding to the intermediate image; and
determining one or more thresholded coefficients by adaptively thresholding one or more of the determined transform coefficients.

6. The method of claim 5, wherein updating the second image solution comprises determining an inverse transformation of the one or more thresholded coefficients.

7. The method of claim 5, wherein determining the transform coefficients comprises transforming the intermediate image to determine the transform coefficients.

8. The method of claim 5, wherein determining the one or more thresholded coefficients by adaptively thresholding the one or more of the transform coefficients comprises:
generating a list of transform coefficients comprising the determined transform coefficients and an error estimate corresponding to each of the determined transform coefficients;
selecting a determined transform coefficient from the list of transform coefficients that corresponds to a minimum error estimate in the list of transform coefficients;
equating the selected transform coefficient to an adaptive thresholding parameter; and
selecting one or more of the determined transform coefficients utilizing the adaptive thresholding parameter resulting in the one or more thresholded coefficients.

9. The method of claim 8, wherein generating the list of transform coefficients comprises:
initializing the list of transform coefficients to include each of the determined transform coefficients;
selecting a determined transform coefficient of the determined transform coefficients;
determining an error estimate corresponding to the selected transform coefficient; updating the list of transform coefficients by including the error estimate corresponding to the selected transform coefficient;
iteratively selecting a new transform coefficient of the determined transform coefficients to determine an error estimate corresponding to the new transform coefficient and updating the list of transform coefficients utilizing the new transform coefficient and the error estimate corresponding to the new transform coefficient.

10. The method of claim 9, further comprising iteratively selecting the new transform coefficient until the list of transform coefficients comprises an error estimate corresponding to each of the determined transform coefficients.

11. The method of claim 5, wherein determining the intermediate image comprises:
forward projecting the updated linear combination solution to a data space to obtain a forward projected linear combination solution;
subtracting the forward projected linear combination solution from the undersampled data to determine an intermediate difference;
backward projecting the intermediate difference to an image space to determine a backward projected intermediate difference; and
adding the backward projected intermediate difference to the updated linear combination solution to determine the intermediate image.

12. The method of claim 11, wherein forward projecting the updated linear combination solution further comprises undersampling the forward projected linear combination solution at locations substantially similar to undersampled locations of the undersampled data.

13. The method of claim 1, further comprising iteratively determining the thresholded coefficients until a stopping criteria is satisfied.

14. The method of claim 13, wherein the stopping criteria comprises a norm difference between the undersampled data and a forward projection of an updated second image solution.

15. The method of claim 1, further comprising generating a resultant image utilizing the reconstructed data signal.

16. A signal processing system, comprising one or more processors configured to
receive undersampled data corresponding to an object;
initialize a first image solution and a second image solution;
determine a linear combination solution based upon the first image solution and the second image solution;
generating a plurality of selected coefficients by iteratively updating the first image solution, the second image solution and the linear combination solution and adaptively thresholding one or more transform coefficients utilizing the undersampled data, an updated first image solution, an updated second image solution and an updated linear combination solution; and
reconstruct a data signal using the plurality of selected coefficients.

17. The system of claim 16, wherein the system comprises a computer tomography imaging system, an ultrasound imaging system, a magnetic resonance imaging system, an X-ray imaging system, a positron emission tomography imaging system, or combinations thereof.

18. The system of claim 16, wherein the object comprises a patient, baggage, or industrial parts.

19. The system of claim 16, further comprising a display device for display of images.

20. The system of claim 16, wherein the processing subsystem is further configured to iteratively determine the thresholded coefficients to generate the plurality of selected coefficients until a stopping criteria is satisfied.

* * * * *